United States Patent [19]
Horvath

[11] 3,721,489
[45] March 20, 1973

[54] REFLECTOR
[76] Inventor: Steve Horvath, 915 W. Bluelick, Lima, Ohio 45801
[22] Filed: July 23, 1971
[21] Appl. No.: 165,675

[52] U.S. Cl. ..........................350/97, 33/348, 33/354
[51] Int. Cl. ...............................................G02b 5/12
[58] Field of Search................350/97, 101, 103, 243; 240/6.44; 33/207 R; 356/249

[56] References Cited
UNITED STATES PATENTS 3,422,544   1/1969   Wyse ................................33/207 R
1,667,026   4/1928   Boyce................................350/101
2,695,949   11/1954  Ashwill..............................33/207 R Primary Examiner—David Schonberg
Assistant Examiner—Michael J. Tokar
Attorney—William P. Hickey

[57] ABSTRACT

A reflector and/or tail light for mobile dwellings and the like having means therein for leveling a portable dwelling on uneven terrain.

5 Claims, 7 Drawing Figures

PATENTED MAR 20 1973
3,721,489
SHEET 1 OF 2
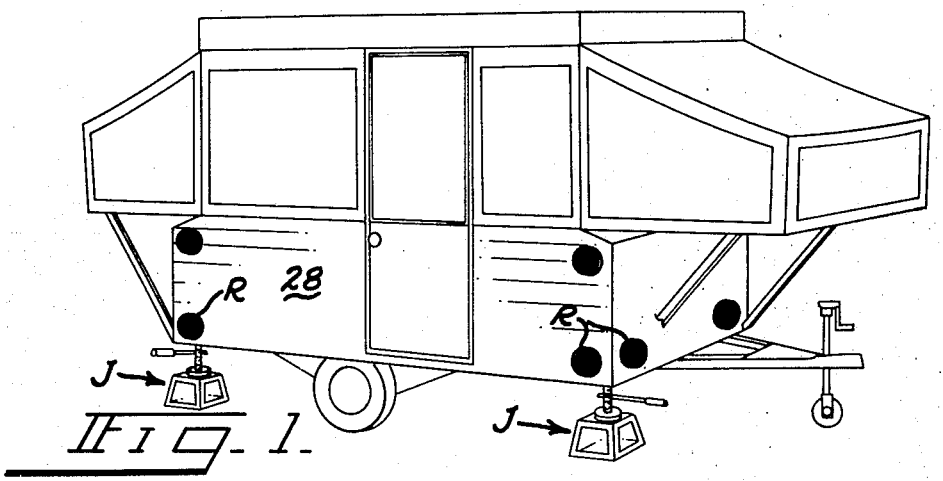
Fig. 1.
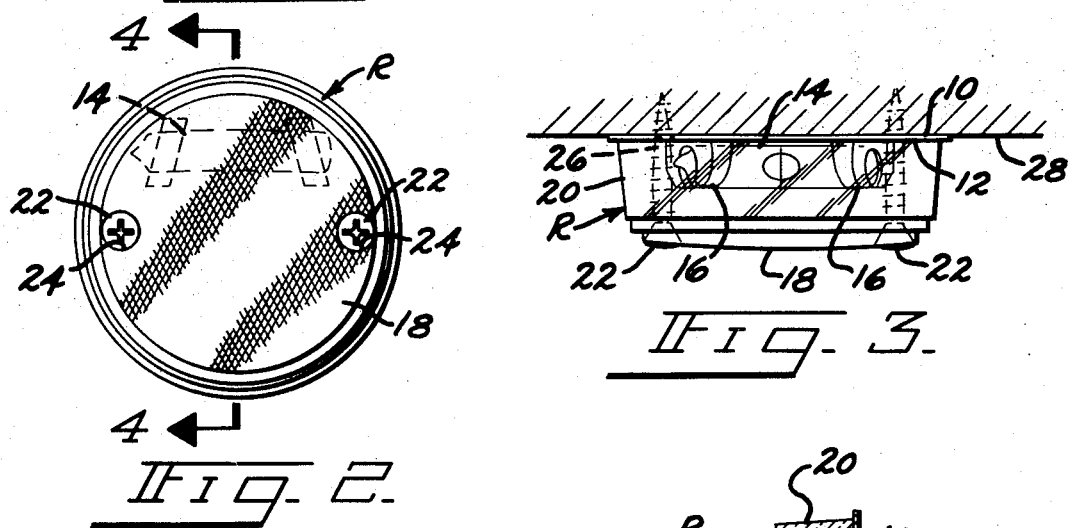
Fig. 2.
Fig. 3.
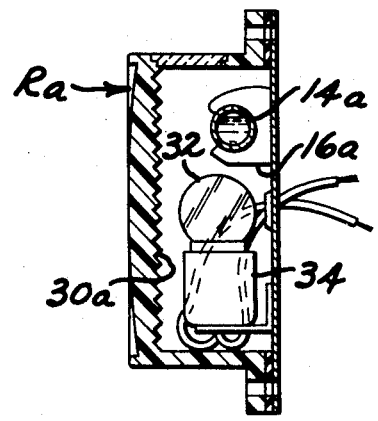
Fig. 5.
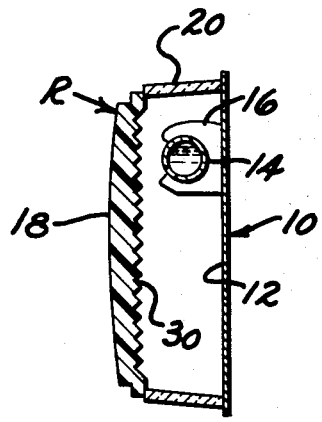
Fig. 4.
INVENTOR.
STEVE HORVATH
BY
William P. Hickey
ATTORNEY

REFLECTOR

BACKGROUND OF THE INVENTION

Portable dwellings, as for example campers and vacation trailers, have sprung bodies to absorb road shock. After these vehicles are moved to a destination, the frame must be rigidly supported from the terrain before it is ready to be used as a dwelling, otherwise movement within the dwelling will cause the springs to deflect and the body to sway. In addition, the portable dwellings quite often are parked on uneven terrain, and movement about the dwelling, or sitting, or sleeping in the dwelling when it is not level is uncomfortable. Campers and vacation trailers, therefore are usually provided with jacking means at each corner of the vehicle for the purpose of rigidly supporting and leveling the trailer during occupancy. These campers and trailer are usually determined to be level by their appearance only. As far as I am aware there is no quick and convenient method whereby all four jacking means can be adjusted quickly to level the trailer.

An object of the present invention, therefore, is the provision of a new and improved means for leveling the frame of a portable dwelling.

Another object of the invention is the provision of a new and improved reflector for attachment to portable dwellings and the like, and having a level indicating device combined therewith in a manner to protect the level indicating device and shield it from bright lights in the night season.

A still further object of the invention is the provision of a new and improved reflector and level indicating device wherein the level indicating device does not interfere with the functioning of the reflector and the reflector seals and protects the level indicating device.

Further objects and advantages of the invention will become apparent to those skilled in the art to which the invention relates from the following description of the preferred embodiments described with reference to the accompanying drawings.

BRIEF DESCRIPTION OF THE DRAWINGS

FIG. 1 is an isometric view of a camping trailer having a plurality of the reflectors of the present invention affixed thereto;

FIG. 2 is a side view of a reflector shown in FIG. 1;

FIG. 3 is a plan view of the reflector shown in FIG. 2;

FIG. 4 is a section view taken approximately on the line 4—4 of FIG. 2;

FIG. 5 is a vertical sectional view similar to FIG. 4 but showing another embodiment of the invention;

DESCRIPTION OF THE PREFERRED EMBODIMENTS

Figure 6:
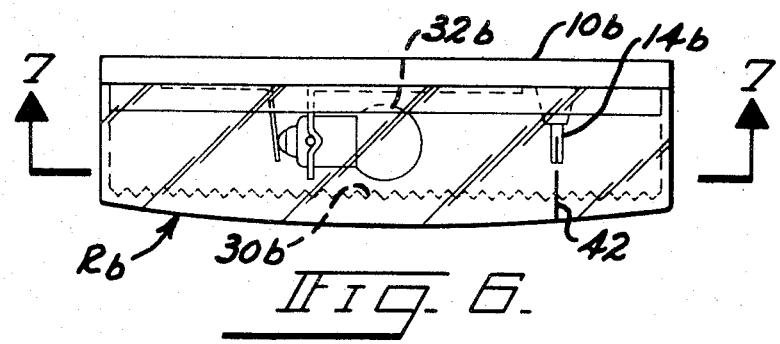
FIG. 6 is a plan view similar to FIG. 3 but showing still another embodiment of the invention.

The embodiment of the invention shown in FIGS. 1 through 4 generally comprises a rear closure member 10 having a front light reflective surface 12, a level indicating device, which in the present instance is a spirit level, is supported forwardly of the light reflective surface 12 by a pair of brackets 16, and a reflector lens 18 is positioned forwardly of the level indicating device 14. In the present instance the lens is made of a red plastic and is suitably molded as will later be described. The lens 18 is spaced from rear closure 10 by conically shaped sidewalls 20 which are cemented or made integral with the lens 18, and which sealing abut the closure member 10. In the present instance the conically shaped sidewalls 20 are clear plastic and are cemented to the lens 18. The brackets 16 are made of plastic, and are cemented to the rear closure member 10. The lens 18 and sidewalls 20 are held in sealing engagement with the closure member 10 by a pair of screws 22 which extend through openings 24 in the lens 18 and through openings 26 in the rear closure member 10 to threadably engage the wall structure 28 of the trailer body. The rear surface of the lens 18 is dimpled as at 30 so that light rays that are beamed on the lens 18 are reflected off of the surface of the dimples at less than the critical angle of reflection and this process is repeated a number of times until the light is reflected back in the direction from which the beam came. The construction of such dimples is known by the art.

FIG. 1 of the drawings shows a plurality of the reflectors as mounted on a camper adjacent corners thereof. Jacks are positioned beneath the corners, and the reflectors are positioned over the jacks so that a man bending downwardly to actuate the jack can look through the sidewalls 20 of the reflector to view the level indicating device 14 therein. The jack on the highest portion of the terrain is adjusted to engage the trailer, and thereafter the jack on the other end of the adjacent side is actuated to level one side of the trailer. The process is then repeated for the other jacks.

It will now be seen that the present invention makes it possible to eliminate all of the guesswork that has been involved heretofore in leveling a trailer. Prior to the present invention, the inventor has placed a marble on the floor of the trailer and has observed the corner to which the marble would roll. The lowest corner was then jacked and the process repeated until something resembling level was achieved. It will be apparent that the level indicating device 14 is fully protected from dirt and breakage, and is shielded from light beams by the reflector lens 18 to prevent glare from preventing observance of the bubble in the spirit level. Some of the light of course passes through and escapes the dimpled backing 13, and this is sufficient to illuminate the indicating device 14 while removing blinding glare.

The embodiment shown in FIG. 5 corresponds generally with the embodiment shown in FIGS. 2 through 4, but differs principally therefrom in that a light bulb or lamp 32 is installed therein and the back of the lens 18 is formed in such a way as to take diverging rays from the lamp and beam them forwardly in generally parallel rays. The portions of the embodiment shown in FIG. 5 which correspond with the portions shown in FIGS. 2 through 4 are designated by a like reference numeral characterized further in that a suffix *a* is affixed thereto.

The lamp 32 is supported with its filament centrally located relative to the lens 18a by the lamp support bracket 34. The dimples 30a are in the form of concentric surfaces which take the direct rays of the lamp 32 and bend the rays forwardly in a parallel beam. The level indicator 14a is located outside of the path of the direct rays which fall on the outermost surface 30a. There is therefore a cone of light from the lamp 32 which impinges on the surface, and the indicator 14 is outside of this cone.

Figure 7:
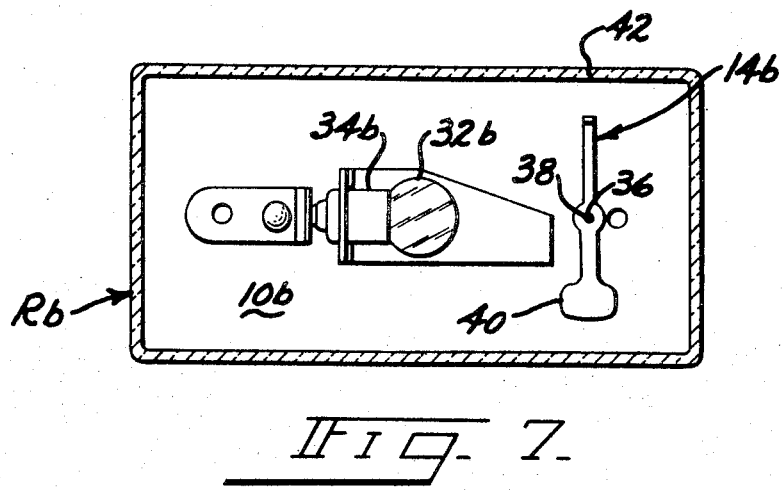
FIG. 7 is a sectional view taken approximately on the line 7—7 of FIG. 6.

The embodiment shown in FIGS. 6 and 7 has portions which are similar to those of the previously described embodiments, and these portions are designated by like reference numerals characterized further in that a suffix b is affixed thereto. The embodiment shown in FIGS. 6 & 7 differs principally from the previously described embodiments in that it is generally rectangularly shaped and a different type of level indicating device 14b is used.

The level indicating device 14b is a weighted pointer having a journal 36 adjacent its center and through which a pivot pin 38 extends. The pivot pin 38 is fixed to the rear closure member 10b and the bottom of the pointer is weighted as at 40 to cause the pointer to assume a vertical position. Indicia 42 is provided on the top side of the reflector, which indicia 42 is positioned directly over the pointer when the reflector is level. It will be seen that the level indicating pointer 14b is adequately supported against road shock, and is shielded from dirt, the weather and undesired glare producing light beams during the night season. The level indicating device 14b is located outside of the conical rays of light which are emitted from the lamp and which impinge directly on the light redirecting surface 30b.

While the invention has been described in considerable detail, I do not wish to be limited to the particular embodiments shown and described, and it is my intention to cover hereby all novel adaptations, modifications and arrangements thereof which come within the practice of those skilled in the art to which the invention relates.

I claim:

1. A reflector for house trailers and the like having spaced front and rear portions and comprising: a rear closure member having a light reflective forwardly facing surface, a gravity actuated level indicator in front of said light reflector surface, a light reflecting lens positioned in front of said level indicator, said lens being of a light transmitting material and having a configuration on its rear surface for receiving light rays originating forwardly of said lens and redirecting a portion of said light rays forwardly, and sidewalls between said lens and said light reflective surface, said sidewalls shielding and protecting said level and light reflective surface and having a portion through which said level indicator can be viewed, and whereby said level indicator is illuminated and protected by said lens without said leveling indicator interfering appreciably with the functioning of said lens.

2. The reflector of claim 1 wherein said rear surface of said lens is configured to return light that is beamed rearwardly onto said lens with a portion being reflected from said light reflective surface to illuminate said level indicator.

3. The reflector of claim 2 wherein said level indicator is a spirit level.

4. The reflector of claim 2 wherein said level indicator comprises a pointer, means pivotally supporting said pointer about an axis intermediate its ends, and said pointer having a greater mass below said axis than above said axis.

5. The reflector of claim 1 including: a lamp between said lens and said light reflective surface, said rear surface of said lens being configured with concentric segments which beam light from said lamp forwardly, and said level indicator being positioned generally to the side of an imaginary plane connecting the center of said lamp with the outer edge of said concentric segments.

* * * * *